W. C. WRIGHT.
MACHINE FOR LEATHER FLEXING AND TEMPERING.
APPLICATION FILED SEPT. 26, 1916.

1,313,510.

Patented Aug. 19, 1919.
5 SHEETS—SHEET 1.

Inventor:
Wallace C. Wright,
by Geo. H. Maxwell,
Attorney.

W. C. WRIGHT.
MACHINE FOR LEATHER FLEXING AND TEMPERING.
APPLICATION FILED SEPT. 26, 1916.

1,313,510.

Patented Aug. 19, 1919.

Inventor:
Wallace C. Wright,
by Geo. H. Maxwell,
Attorney.

W. C. WRIGHT.
MACHINE FOR LEATHER FLEXING AND TEMPERING.
APPLICATION FILED SEPT. 26, 1916.

1,313,510.

Patented Aug. 19, 1919.
5 SHEETS—SHEET 4.

Inventor:
Wallace C. Wright,
by Geo. H. Maxwell,
Attorney.

UNITED STATES PATENT OFFICE.

WALLACE C. WRIGHT, OF LYNN, MASSACHUSETTS, ASSIGNOR TO BASLER MACHINERY COMPANY, OF LYNN, MASSACHUSETTS, A CORPORATION OF MAINE.

MACHINE FOR LEATHER FLEXING AND TEMPERING.

1,313,510.  Specification of Letters Patent.  Patented Aug. 19, 1919.

Application filed September 26, 1916. Serial No. 122,243.

*To all whom it may concern:*

Be it known that I, WALLACE C. WRIGHT, a citizen of the United States, and resident of Lynn, county of Essex, and State of Massachusetts, have invented an Improvement in Machines for Leather Flexing and Tempering, of which the following description, in connection with the accompanying drawings, is a specification, like letters on the drawings representing like parts.

My present invention is an improved machine especially intended for use in rendering leather flexible by working the same to and fro in a plurality of undulations and for permitting a supply of liquid to be applied to the leather during such working.

The invention is particularly applicable to machines of the type shown and illustrated in the U. S. Patent No. 1,175,680, issued March 14, 1916, and more particularly as illustrated in my copending application Serial No. 61,316, the object of the invention being to improve and perfect machines of this type.

It has been found desirable, in the manipulation of certain kinds of leather, such as leather soles, to provide means which will increase or decrease the bending or flexing of the soles as the same are put through the machine. The present machine has improved and adjustable means for this purpose, enabling additional sole flexing mechanism to be thrown into or out of operative position instantly and during the continuous operation of the machine. Thus, if the operator sees that the leather soles being put through the machine require additional flexibility, he can, at any time, throw into automatic operation an additional sole flexing apparatus and maintain the same in operative position as long as desired. Further improvements in the magazine and automatic supply of soles to the machine and to the delivery mechanism from the machine, are features.

A further feature of the present machine consists in the provision of means which will render the machine adaptable to feed a leather blank or strip into and out of the tempering solution with a minimum of flexing movements and less time to absorb solution, or to send the blank through the entire machine, at the will of the operator. Thus, for example, should the operator have a bunch of soft leather, it is desirable that this bunch be only slightly dipped in the solution and given a bending or undulating action and quickly fed out from the machine. Means are provided to instantly and automatically effect this action, and then to set the mechanism to feed the next bunch of leather blanks through all of the flexing rolls. In the former instance, the sole could be fed through in four or five seconds, and in the latter, in twenty seconds, without stopping the machine or changing its speed. I accomplish this by providing, at any point desired, or at a plurality of points, if desired, adjustable guiding means to deflect a leather blank as it is fed through the top rolls, around the intermediate roll and into the returning set of rollers toward the delivery mechanism. Such adjustable guides could be placed at predetermined points throughout the machine and thus a leather blank could be sent around two pairs of rolls, six pairs, or more, and out of the machine at the will of the operator.

Referring to the drawings, illustrating a preferred embodiment of the invention.

The machine illustrated in the drawings is of the type shown in my said prior application Serial No. 61,316, and reference thereto is hereby made for further details of construction and operation.

Figure 1:
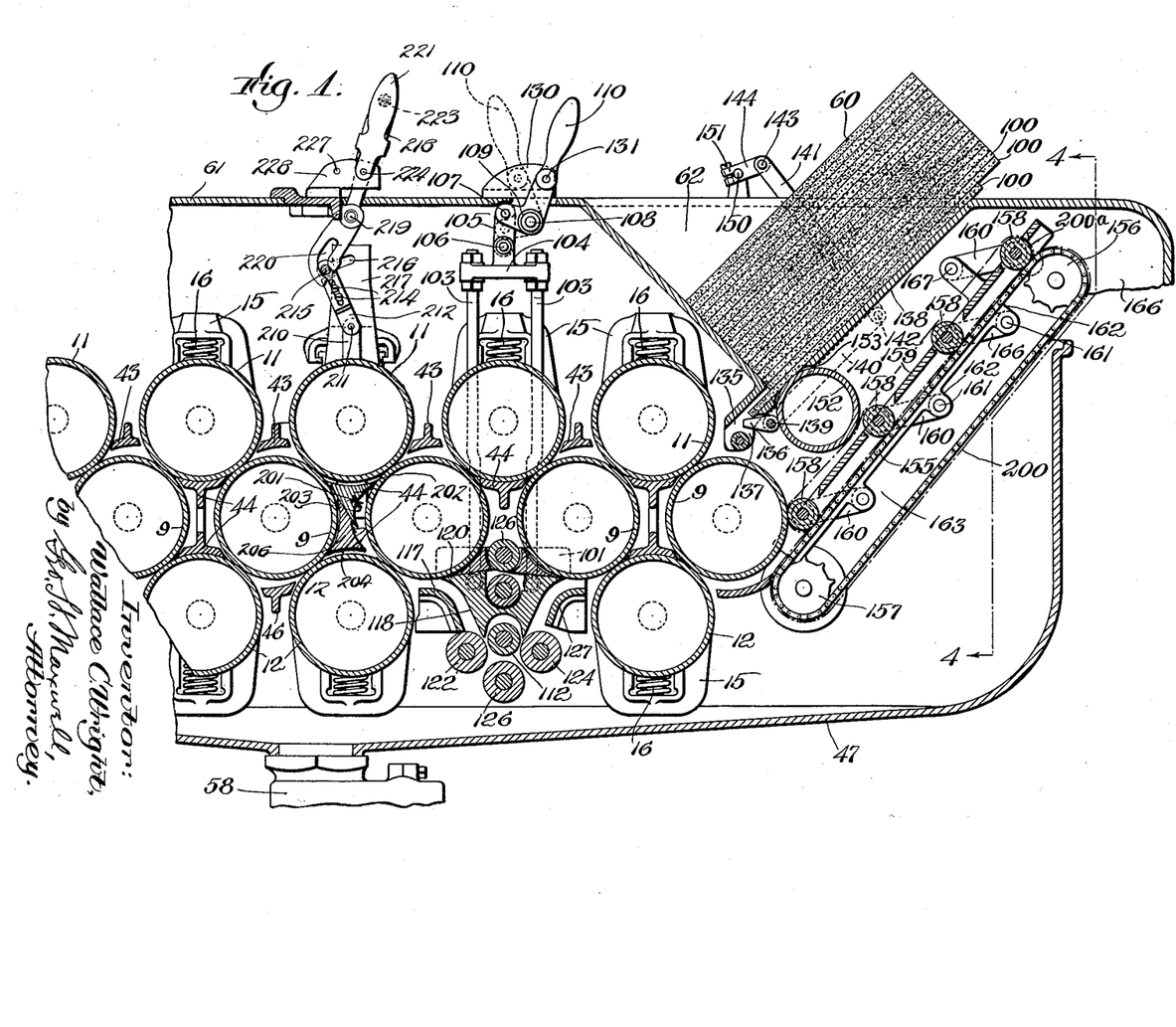
Figure 1 is a fragmentary view of a machine, in cross section, illustrating the invention.

The machine includes a framework (omitted for sake of clearness) supporting a plurality of intermediate rollers 9 arranged in staggered rows with an upper set of rollers 11, and a lower set of rollers 12, operating in unison to feed a sole blank between the rollers 11 and 9 from the magazine 62 containing a mass of sole blanks 60 shown at the right of the machine, Fig. 1, toward the left of the machine and then guiding the blank around to feed backwardly between the rollers 9 and 12 to the right, said outer rows of rollers 11 and 12 being yieldingly supported, the bearings therefor sliding in frames 15 against the tension of coiled springs 16, as illustrated and as more fully explained in said copending application. This arrangement permits the rolls to yield automatically while feeding through blanks of different or varying thicknesses and also to maintain a substantial predetermined pressure upon the roll, depending upon the tension of each set of springs 16, as will be readily understood. Intermediate guides 43 between the upper rolls 11 and corresponding guides 44 between the intermediate set of rolls 9 together with similar guides 46 between the lower rolls 12 are shown to insure the proper feeding of a sole blank throughout the machine. A tank 47 adapted to hold liquid and to be raised and lowered about the feeding and flexing rolls, is also arranged, as well as a cover 61, having a magazine recess 62 already mentioned. The mechanism above described constitutes the same machine elements similarly numbered as in my said copending application, and the particular improvements will now be described.

Figure 2:
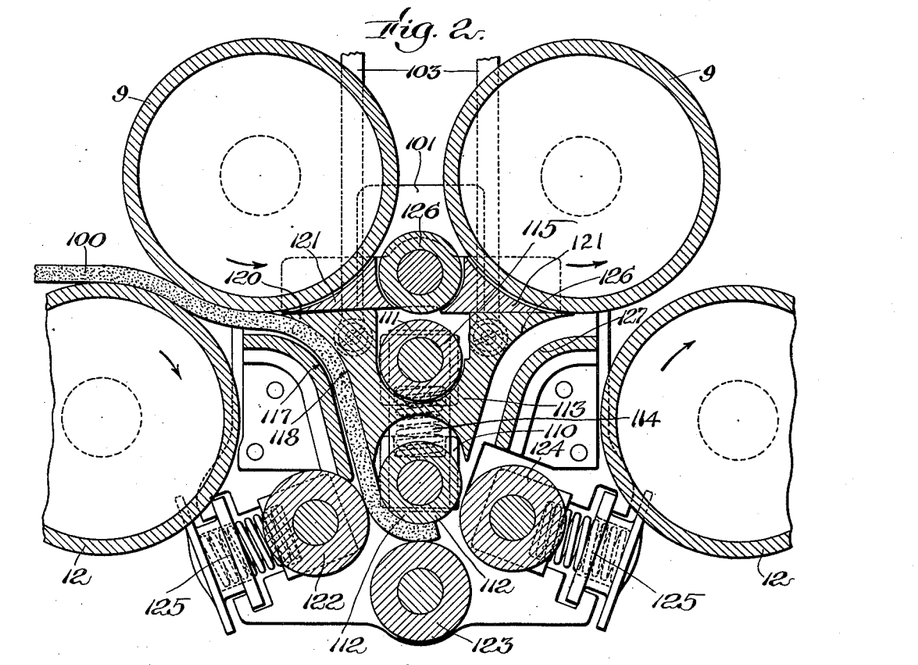
Fig. 2 is an enlarged cross-sectional view of the additional automatic sole flexing means in operative position.
Figure 3:
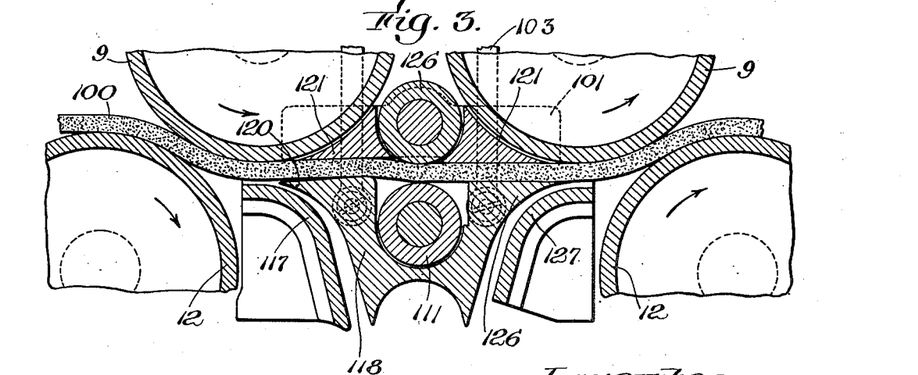
Fig. 3 is a fragmentary cross sectional view showing this adjustable sole flexing device in inoperative position.
Figure 4:
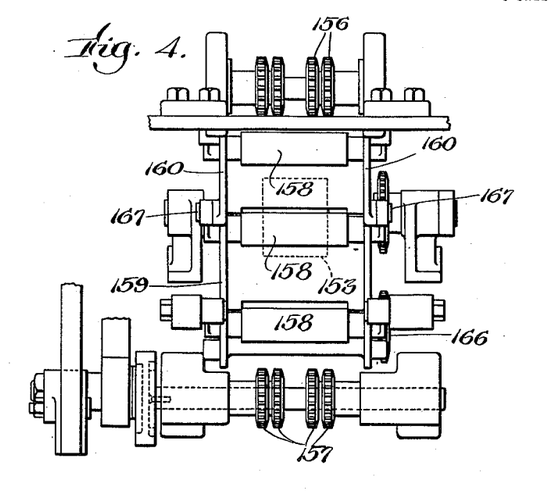
Fig. 4 is a view of the delivery mechanism on the line 4—4 of Fig. 1.

In order to arrange automatic means which will effectually give an additional flexing action on a sole, turning it sharply around a curve of short radius, preferably less than any of the prior undulating or turning movements, and therefore imparting a sharper bending movement across the sole blank, I provide the adjustable device best illustrated in Figs. 2 and 3. This adjustable apparatus is preferably arranged at the out-going end of the machine, where the sole blank is last acted upon. As the sole blank 100 is fed through the machine, being flexed backwardly and forwardly transversely across the line of its movement, and progressively from end to end, either during the application of the tempering fluid thereto, or even without the same, the fibers are bent or "worked" into a flexible state and the entire sole is rendered pliable by the time it is fed back to the entrance and delivery end of the machine. To give the sole blank a still further turn, if desired, I mount an additional set of rollers of small radius on a pair of sliding plates 101, having projecting lugs 102 adapted to fit in suitable slides in the framework (not shown) and carrying journal bearings for the set of rollers, to be described, said plates being connected by rods 103 with a cross head 104 arranged near the top of the machine, to which are pivoted the links 105 at 106. The outer end of said links are pivotally connected at 107 to a rockshaft 108 by short levers 109. A handle lever 110 is also mounted on the rockshaft 108 and the mechanism is so arranged that movement of the handle 110 will raise or lower the rods 103 and similarly raise or lower the plate 101 carrying the rollers, to be described. The rollers mounted in suitable journal bearings in the plates 101 include an inner set of rolls 111 and 112, each having its journal bearings mounted in the slides 113 in each plate 101 and with common springs 114 acting against the journal bearing slides 115 for the upper roll 111, and 116 for the lower roll 112. Deflecting guides 117 and 118 are also arranged to control the feeding movement of the sole blank 100, the guide 118 having a sharp nose 120 at the feeding-in end of this adjustable apparatus. The extent of raising and lowering of the supporting plates 101 is shown in its two extreme limits as indicated in Figs. 2 and 3, the upward movement of the lever 110 serving to raise the plates 101 and the guides 126 and 118 attached thereto upwardly in contact with a portion 121 of the particular guide plate 44 on the frame of the machine between the adjacent rolls 9 at this point. With the mechanism raised as shown in Fig. 2 a sole blank 100 is deflected by the nose 120 and guide plates 117 and 118 downwardly to contact with the lower roll 112 of small radius, which may yield against the tension of the spring 114. To insure the continued feeding and sharp bending of the sole around the small roll 112, guide rollers 122, 123 and 124 are arranged in close proximity (see Fig. 2), all carried by the plates 101. I prefer to arrange the side rollers 122 and 124 with yielding bearings, the springs 125 holding these side rolls yieldingly in contact with the sole blank 100 and being preferably arranged with a suitable adjustment for tension similar to those on the feeding and flexing rolls 11 and 12, as described in detail in my said copending application.

Guide plates 126 and 127 corresponding in form to 117 and 118 are made to conduct the sole blank backwardly and upwardly to the succeeding pair of feeding rolls 9 and 12.

When the handle 110 is manipulated to lower the plates 101, as shown in Fig. 2, the nose 120 of the guide 118 acts to deflect the sole blank 100 from the course around the small roll 112 and feed the same directly across to the succeeding rolls 9 and 12. To facilitate this feeding action I prefer to arrange the guides 118 and 126 to coöperate with the frame portions 121 and to constitute a channel of appropriate width for the sole blank, leading it over the top roller 111, which may yield against the tension of the spring 114 and preferably also provide a fixed idler 128 mounted in a groove in the portion 121.

Figure 5:
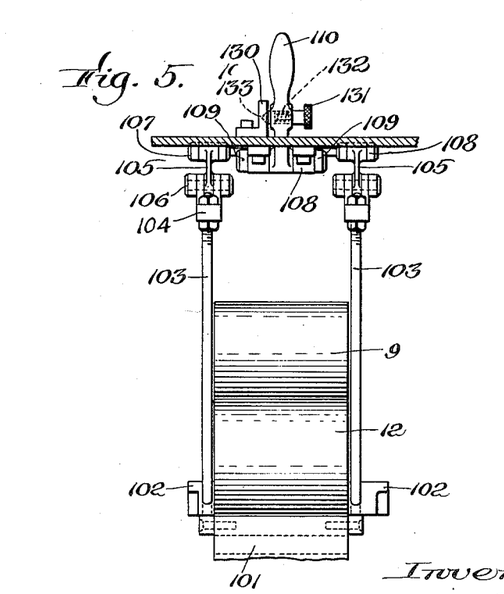
Fig. 5 is a detailed view, partly in cross section, of the means to operate the additional sole flexing devices.

The operation of the device has already been explained and will be readily appreciated from the drawing. Normally the apparatus may be in lowered position, as shown in Fig. 3, with the sole blanks 100 feeding through from one pair of rolls 9 and 12 to the succeeding rolls 9 and 12, but should an extra set of hard tanned or knotted leather be put into the machine, or if for any other reason it is desired to increase the flexibility of the rolls, the lever 110 is manipulated to raise the apparatus and conduct the sole blank around the extra sharp flexing roller 112. A guide or rack 130 is provided for the handle 110, together with a yieldingly actuated locking plunger 131 which is normally moved by a coiled spring 132, see Fig. 5, and will snap into recesses 133 in the rack 130 to hold the apparatus in raised or lowered positions respectively, and retain it firmly locked as long as desired by the operator. Withdrawing the plunger 131 against the tension of its spring 130 will release the locking action from either position.

The automatic feeding of sole blanks is a matter of the greatest importance in this type of machine, and I have devised a novel means to control this feeding action. A mass of sole blanks 60 are positioned in the magazine 62 and provision is made for feeding the lowermost sole blank 100 of the mass through the throat 135 into the grip of the first pair of feeding and flexing rolls 9 and 11, adjacent the throat 135. In order to arrange automatically for the handling of sole blanks of different thicknesses by the same machine, an automatic and adjustable gate is affixed, comprising a sole-engaging gate member 136 adapted to control the width of the throat 135 by an oscillating movement through a recess 137 in the lower wall 138 of the magazine 62. This member 136 is affixed to a rockshaft 139 mounted in any convenient portion of the adjacent framework, said rockshaft being oscillated by a pair of links 140 and 141 pivoted together at 142 and with the outer end of the link 141 connected at 143 to a short lever 144, which lever may be adjustably secured on a cross rod 150 supported on the top 61, this lever having a forked end straddling the rod and a threaded screw 151 connecting the forked end of the lever and clamping said lever on the rod 150 in any desired position. Any clamping of the lever 144 and oscillation of the same acts to correspondingly oscillate the member 136 and thus limit the throat opening 135 through which a sole blank 100 may be fed.

To positively actuate the lowermost blank of the mass 60, and insure its effectually feeding a blank, I provide a feed wheel 152, which may have its periphery toothed in position to project through an appropriate recess 153 in the lower wall 138 and engage the lowermost sole blank, rotation of the feeding wheel acting to feed out the lowermost blank and start it through the machine. If desired, a weight, spring or other engaging device to feed a mass of sole blanks downwardly toward the face 138 as shown in my said copending application, can be employed.

Improved delivery mechanism for transferring a sole blank after it has completed the course through the machine, is herein shown. As the tank 47 is usually filled with liquid and the sole blank is fed in through the top of the mechanism and backwardly through the lower portion of the tank, it is necessary to feed the completely flexed and tempered sole upwardly out of the tank to a delivery carrier or other receiving device, and to permit the sole to have any surplus liquid drained off and returned to the tank 47. It is also desirable to have the grain side of the sole 100 uppermost in the magazine, so that the feed wheel 152 will not mar the grain side of the sole, but its toothed engagement will be on the reverse of each sole fed forwardly. Consequently, when the sole is delivered from the machine, it has the grain side downwardly, and it is important to provide mechanism which will not mar the same. It is also necessary to have such delivery arrangement automatically adjustable for different thicknesses of sole blanks, and to this end I arrange a conveyer chain 155 led around guide sprockets 156 and 157 from either of which sprockets power may be received to rotate the same. A plurality of top engaging rollers 158 have journal bearings on the ends of links 160 for parallel movement toward and from the upper portion of the chain conveyer 155. A cover 159 having suitable recesses through which the rollers 158 may run, is also arranged, which is secured to a stud 167. These links 160 may rest in cross rods 161 underneath the upper line of travel of the belt 155 and held in corresponding recesses 162 in a portion 165 of the frame. As the sole blank is fed out of the machine on to the carrier 155 the rollers 158 will rise sufficiently through rocking of the links 160 and lifting of their carrier members 159, while still holding the sole into engagement with the chain 155 until it is fed outwardly from the machine at the delivery orifice 166. I find that such a chain conveyer with the yielding pressure of the rollers 158 is sufficient to actually feed a completely flexed sole blank out of the machine while it will not mar the grain side and furthermore will permit the surplus liquid to drain off through the chain carrier back into the tank, thus conserving the liquid while the pressure rolls 158 will not squeeze out or remove the liquid carried by the sole blank, thus delivering the same completely saturated and in temper. The degree of saturation and tempering can be regulated, as explained in my said copending application, either by the speed of feeding through the tank or the lowering of the liquid level in the tank, as well as by the adjustment of the tension of the springs 16 of the feeding rolls.

My improved mechanism for this type of sole flexing and tempering machine acts to handle the sole blanks automatically, without hitch or sticking, and feeding the same either with the additional sharply flexing device of Figs. 2 and 3 or without it, tending to make all of the sole blanks fed through of uniform temper and flexibility, irrespective of their original condition of hardness, different tannages, etc. In fact, it has been found that many of the poorer grades of leather which were heretofore considered unsuited for use as soles for boots and shoes are rendered usable by the passage through this machine, and my improved feeding, delivery and extra flexing device enables a better and more uniformly tempered output, as well as permitting speeding up of the mechanism, feeding sole blanks therethrough in a few seconds, and conserving the liquid employed.

Figure 6:
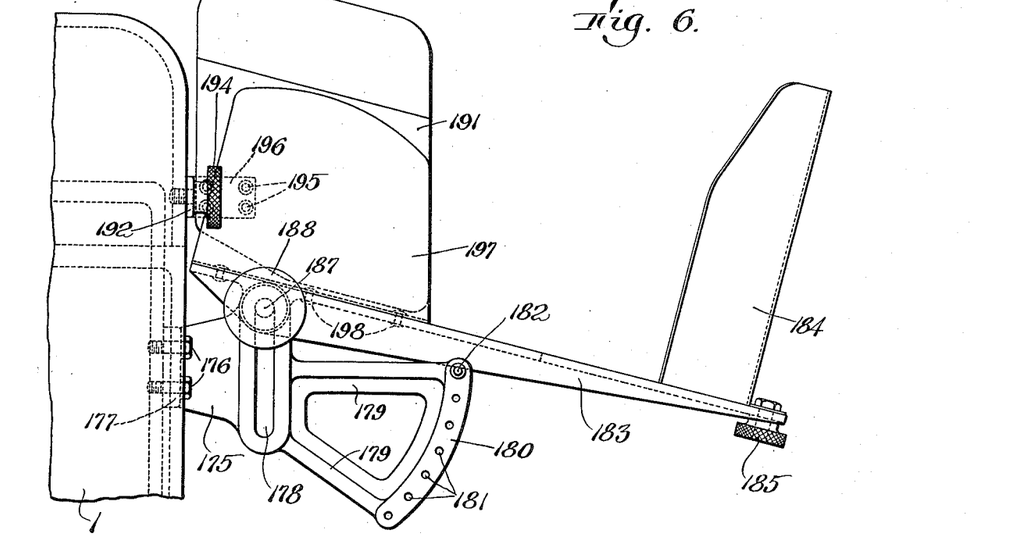
Figs. 6 and 7 are side and end views of adjustable delivery devices.
Figure 7:
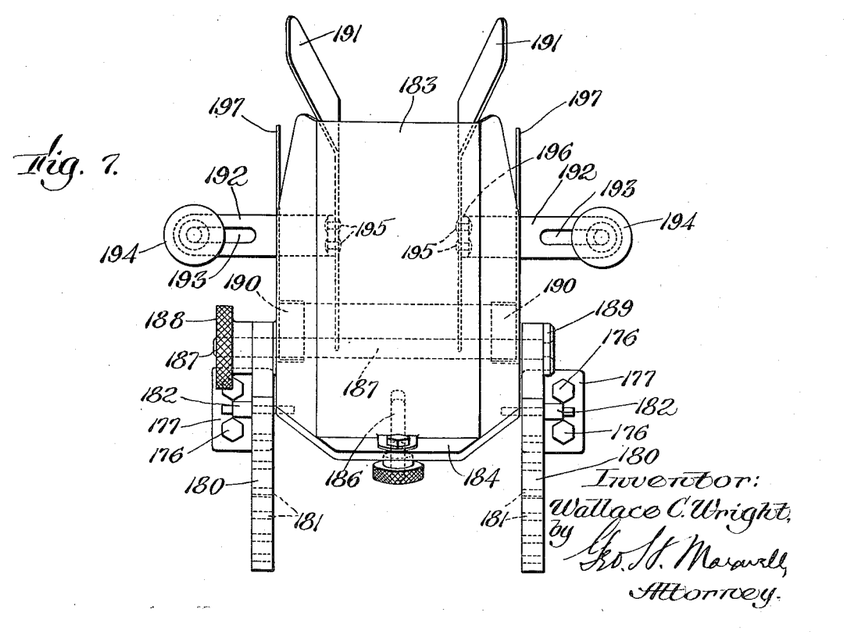

In Figs. 6 and 7 I have illustrated an improved and novel arrangement for receiving the tempered sole blanks as they are delivered from the machine. It is important that these sole blanks be permitted to lie flat, and to be piled up evenly for subsequent handling, counting, tying up in bundles, etc. To this end I have made a receiving apparatus which can be adjusted for height, angle and for receiving soles of different lengths, piling the same evenly. A long sole will be ejected from the machine by the delivery mechanism and will require one angle of the receiving apparatus to permit the sole to strike the same substantially straight, flat, and without wrinkles, bends, etc. A shorter sole will require a different angle, which can quickly be secured by the operator during the first two or three soles run through the machine. As shown in Fig. 6, I attach to the side of the frame 1 of the machine adjacent the delivery end a pair of brackets 175, each secured by bolts 176 through flanges 177 formed on the brackets. These brackets each have a vertical slot 178 and extension arms 179, 179, carrying a segmental rack 180, said brackets being spaced a distance slightly wider than the width of the largest blank to be handled by the machine. Each rack 180 has a plurality of holes 181 therethrough to receive pins 182, which pins constitute adjustable rests for a plate 183. This plate is of sufficient length and width to receive the largest blank put through the machine and at its outer end carries an adjustable U-shaped guard 184 secured thereto by a thumb screw 185 which slides through the slot 186 to give the desired adjustment for length of blank to be received. The entire plate 183 is pivoted on the bolt 187, which bolt is adjustably held in the vertical slots 178 by passing therethrough and being tightened in any desired height by manipulation of the thumb nut 188 threaded on an outer projecting end of the bolt 187, the other end carrying a head or flange 189 to permit the tightening effect. I prefer to form bracket members 190, 190, at each side the plate 183, which encircle the bolt 187 and hold the plate in assembled position. Loosening the thumb nut 188 and raising and lowering the inner end of the plate 183, as well as shifting the pins 182 in the holes 181 of the racks, will give a large range of inclination of position to the plate, so that it will be capable of quick adjustment at the right angle to receive the tempered sole blanks as they are delivered from the machine. To further aid in stacking up the delivered blanks, I provide a pair of adjustable side wings 191, 191, each being secured to an arm 192 in slots 193 through which the shank of a headed screw 194 may pass to be tapped into an adjacent part of the frame and bind the same in position throughout the limit of adjustment afforded by the slots 193. Each arm 192 is riveted to its respective member 191 by rivets 195 passing through flanges 196, as clearly shown in Figs. 6 and 7. I also prefer to add a side guard 197 at each side of the plate 183 which may be held thereon in any suitable manner, as by rivets 198, shown in dotted lines in Fig. 6. The adjustable wings 191 may work inside of these guards 197, and when blanks of large size are being handled, the wings 191 may be entirely removed. This delivery apparatus if of particular value in enabling the machine to be run at increased speed, as one operator can handle several machines at once, simply filling the magazines and removing the soles when the delivery device is full. Usually a mass of blanks put into the magazine will be sorted out of fairly similar stock, so that, when desired, the operator can throw in the additional flexing apparatus for an entire mass of blanks and pay no further attention to the machine until all the blanks are run through and neatly piled up on the plate 183, when another quantity is piled into the magazine. By means of my improvements the capacity and speed of operation of machines of this type have been greatly increased. In fact where it was formerly desirable to run a machine so that a sole blank would be subjected to the flexing and tempering appliances for twenty to thirty seconds, I can now increase the speed and consequently the capacity of the present machine to operate on one sole in five seconds, with equivalent results to those formerly obtained. This will give a machine such as is herein illustrated a capacity of from five thousand to six thousand soles per day.

In some classes of work I find that it may be desirable to utilize a pair of double rubber belts around the delivery mechanism, such belts covering the chain and the adjustable rolls 158 and being operated exactly as hereinabove described. Such rubber belts are indicated in dotted lines at 200 and 200ª, Fig. 1, and are preferably given sufficient tension when stretched over the rolls 158 and the chain 155 as to afford a substantial pressure on both sides of the sole blank fed therebetween. This feature further tends to straighten or iron out the blank after it has been subjected to the to and fro flexing action of the breaking rolls throughout the machine. Also such rubber belts carry up a thin film of solution between them, still further tending to smooth out and broaden the leather blanks just before they leave the machine. This constant pressure of the rubber belts while the soles are in temper prevents "plumping" and in fact preserves and increases the tendency of the entire machine to broaden out and widen the blank. This result is most desirable, as I am actually enabled to utilize a relatively smaller sole blank, which, when put through the machine comes out substantially broader, while preserving its thickness and this enables a substantial saving in leather to be obtained. My experiments thus far indicate that I can use a full size smaller sole blank in the magazine, running the same through my improved machine and it will be, when delivered, broadened out a size larger. This feature will be appreciated by leather workers generally and shoe manufacturers particularly.

Figures 8, 9:
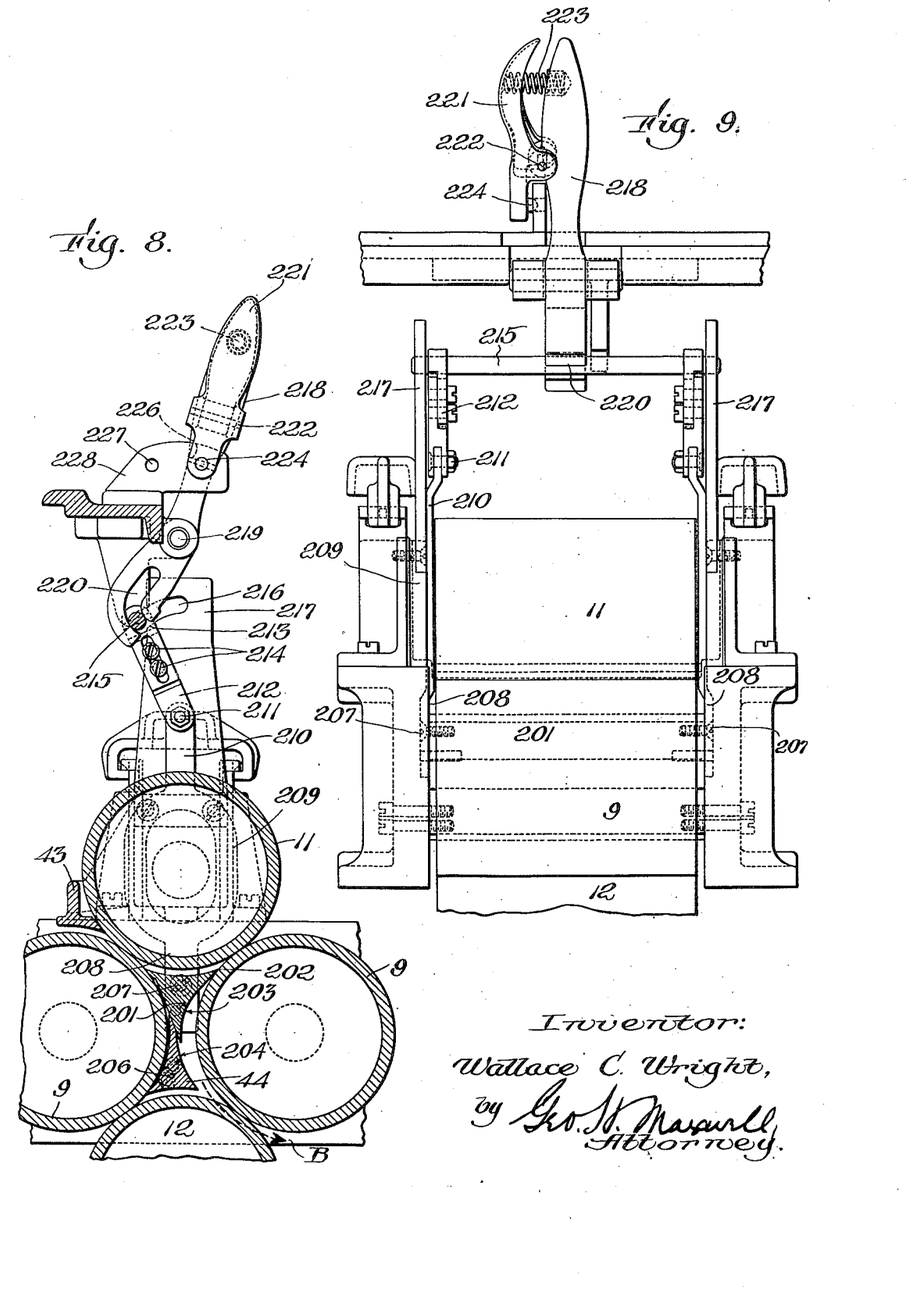
Figs. 8 and 9 are end and front elevations respectively, of the adjustable guiding devices to deflect a leather blank from the feeding in set of flexing rolls to the delivery set, without the blank going around both sets of rollers in the machine.

One of the important features of the present machine is the capability of predetermining the number and extent of the flexing and solution applying operations of the machine, by deflecting a sole blank as it is being fed through the upper set of feeding rolls 11 and 9, downwardly around one of the intermediate rolls 9 into the reversely directed feeding action of the lower rolls 12 and 9. This enables a sole blank to be deflected or switched, wherever desired. To this end I apply a movable guiding device, operable from the external part of the machine similar to the extra breaking mechanism already described, which may be positioned at any desired point in the line of feed through the machine, or at several such points. As illustrated in Figs. 8 and 9, this deflecting mechanism comprises a guiding member 201 arranged for vertical movement between a pair of the intermediate rolls 9 and so arranged as to normally constitute a guide member similar to those shown at 44, Fig. 1, for the continued feeding of a sole blank in the direction of the arrow A, Fig. 8. Upon the raising of this deflector 201, however, closely adjacent the lower rim of a top roll 11, a sole blank feeding in from the direction of the arrow A will be deflected from around the adjacent intermediate roll 9 by the edge 202 and against the curved face 203 of the deflector, which face coöperates with the surface 204 of a fixed lower guide member 206 to switch the sole into the reverse direction as shown by the arrow B between the lower rolls 12 and said roll 9, thus conveying the leather into the delivery line of feed and eliminating the action of the other entire series of rolls through which the work would have passed. Besides greatly speeding up the output of the machine by thus passing a sole more quickly from the receiving magazine to the delivery orifice, less solution is absorbed by the sole, and, of course, less bending imparted to it, whenever this action is deemed desirable. Thus, if the operator finds that the particular bunch of sole blanks are absorbing more solution than is necessary, he can at once shift the deflector 201 or any one such deflector, if there are several arranged longitudinally of the machine, and send the soles through a less amount of solution and around a correspondingly less number of flexing rolls, being also capable of instantly restoring the line of travel of the sole blanks through the machine by such deflecting stations. In order to operate the member 201 I attach the same by threaded screws 207, 207, at either end to side frames 208, 208, extending upwardly and having a forked portion at 209 to span the axles of the upper roll 11, said fork uniting again at 210, into a single extension above the axles of the roll 11 at either end. At the top of each of these rods, at 211, is pivoted a link, having provision for lengthwise adjustment and preferably comprising two sections, the lower 212 and the upper 213, which may slide upon each other, each section being slotted and receiving bolts or binding screws 214, the shanks of said screws passing through said slots. The upper portions 213 of the links at each side of the roll are connected by a rod 215, which rod also extends beyond said links to engage cam grooves 216 in plates 217 extending upwardly from the frame of the machine and providing a guide and bearing for the links and connecting mechanism with the deflector 201. Movement of the links in and out of the cam grooves 216 will act to raise or lower the deflector 201, as will be readily understood. To effect this raising and lowering action, I provide a lever 218 extending upwardly from the top of the machine pivoted at 219 on a fixed bearing across from the side frames of the machine or on the top 61. The lower part of the lever 218 extends downwardly and has formed therein a cam groove 220 adapted to engage the rod 215, approximately at the center, and thus the swinging of the hand lever to and fro on its pivot 219 will move the side links into and out of the cam paths 216. In order to lock the hand lever 218 at the two limits of its movement, I provide a hand latch 221 pivoted at 222 on the handle portion of the lever 218 and with a spring 223 normally oscillating said latch in one direction to force a prong 224 adapted to engage recesses 226 and 227 in a plate 228, also secured to the fixed portion carrying the pivot 219.

This deflector and operating mechanism may be at one point longitudinally of the machine, or a plurality of such deflectors may be arranged, removing the adjacent fixed portions 44 where the deflectors are thus placed, as will be obvious.

My invention is further described and defined in the form of claims as follows:

1. A leather tempering machine of the kind described, having mechanism to moisten, to convey, and to undulate a leather blank in combination with means to vary the undulating action.

2. A leather tempering machine of the kind described, having mechanism to moisten, to convey, and to undulate a leather blank in combination with movable means operable at will to change the undulating action.

3. A leather tempering machine of the kind described, having mechanism to moisten, to convey, and to undulate a leather blank in combination with reciprocable means to vary the undulating action during the continuous operation of the machine.

4. A leather tempering machine of the kind described, having mechanism to moisten, to convey, and to undulate a leather blank in combination with means to vary the undulating action, said varying mechanism comprising a plurality of yielding rollers supported on a movable carrier.

5. A leather tempering machine of the kind described, having mechanism to moisten, to convey, and to undulate a leather blank in combination with means to vary the undulating action, said varying mechanism comprising a plurality of yielding rollers supported on an adjustable carrier, extending within the machine below the moistening apparatus and a lever outside of the machine to operate said carrier and produce variation in undulating action.

6. A leather tempering machine of the kind described, having mechanism to feed and to flex a leather blank through a plurality of flexing means in combination with means operable at will to deflect the leather from a predetermined number of said flexing means.

7. A leather tempering machine of the kind described, having mechanism to feed, to flex and to moisten a leather blank through a plurality of flexing means in combination with means operable at will to deflect the leather from a predetermined number of said flexing means.

8. A sole flexing machine, having mechanism to convey and means to moisten leather fed therethrough, in combination with means operable during the continued actuation of the feeding means to deflect the leather fed therethrough from one feeding direction to another to shorten the time in which the leather is normally acted on by the machine.

In testimony whereof, I have signed my name to this specification, in the presence of two subscribing witnesses.

WALLACE C. WRIGHT.

Witnesses:
JAMES R. HODDER,
HAROLD J. CLARK.